United States Patent
McAlpine

(12) 
(10) Patent No.: US 6,210,074 B1
(45) Date of Patent: *Apr. 3, 2001

(54) MATERIAL AND METHOD FOR LINING PIPES

(75) Inventor: George A. McAlpine, Cary, NC (US)

(73) Assignee: Danby of North America, Cary, NC (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/072,747

(22) Filed: May 6, 1998

Related U.S. Application Data

(63) Continuation-in-part of application No. 08/712,408, filed on Sep. 11, 1996, now Pat. No. 5,785,456.

(51) Int. Cl.[7] .............................. E03F 3/06; E21D 11/00
(52) U.S. Cl. .......................... 405/151; 405/146; 405/155
(58) Field of Search .................................. 405/154, 156, 405/146, 151, 155, 150.1

(56) References Cited

U.S. PATENT DOCUMENTS

| 5,388,929 | * | 2/1995 | Molyneux | 405/151 X |
| 5,395,472 | * | 3/1995 | Mandich | 405/154 X |
| 5,427,154 | * | 6/1995 | Stephens | 405/154 X |
| 5,762,450 | * | 6/1998 | Schmager | 405/154 |

* cited by examiner

Primary Examiner—Eileen D Lillis
Assistant Examiner—Tara L. Mayo
(74) Attorney, Agent, or Firm—Reed Smith Hazel & Thomas LLP

(57) ABSTRACT

A material and method is provided for lining man-entry sized pipes and securing the lining to the pipe. The lining comprises a plurality of adjacent, unplasticized polyvinyl chloride panel segments circumferentially curved within the pipe, each including an interior channel through which grout may be injected. Upon the grout's curing, the grout provides strength and support for a second layer of grout injected into an annulus between the pipe's inner surface and an outer surface of the lining.

25 Claims, 6 Drawing Sheets

MATERIAL AND METHOD FOR LINING PIPES

This is a continuation-in-part of U.S. patent application Ser. No. 08/712,408, filed Sep. 11, 1996, now U.S. Pat. No. 5,785,456, issued Jul. 28, 1998.

BACKGROUND OF THE INVENTION

1. Field of the Invention

The present invention relates generally to a method and material for lining underground pipes such as sewer pipes. More particularly, the present invention relates to a method and material particularly suitable for, but not limited to, man-entry sized circular and oviform pipes.

2. Description of the Prior Art

Sewer pipes often become obstructed or structurally deteriorated due to pipe corrosion by hydrogen sulfide, general degradation, organic growth, and root infiltration. As a result, the flow of sewage can become obstructed or the sewer pipe may collapse. A degraded sewer pipe, even if not obstructed, may allow ground water to infiltrate, thus unnecessarily increasing fluid flow to a treatment plant.

The cost associated with replacing sewer pipes can be prohibitively high, and disruption to above ground traffic may not be feasible. Therefore, sewer pipes are often relined rather than replaced. In order to minimize above ground disruption during sewer pipe relining, sewer pipes are often relined using technology that does not require digging a trench above the sewer pipe.

Relining sewer pipes can be accomplished by installing a layer of unplasticized/rigid polyvinylchloride (uPVC) to form a new inner surface in existing pipes. An annular gap may be created between the existing pipe's inner surface and the new liner's outer surface. Grout may then be injected into this annular gap to strengthen and support the new liner as discussed in U.S. Pat. Nos. 5,388,929, 5,145,281 and 4,678,370.

When a relining and grouting process is carried out in man-entry sized pipes, for example pipes having diameters of 36" and larger, the plastic liner must resist the hydraulic head pressure of the grout as it is being pumped into the annulus between the pipe and the plastic liner. Additionally, because gravity forces the grout to the bottom of the annulus, the liner may float on top of grout collected at the bottom of the annulus.

In order to prevent deflection of the liner due to hydraulic head pressure and to prevent floating, grout is usually injected in successive stages or "lifts". Individual grout lifts cannot be injected until the previous lift is sufficiently cured to not transmit the hydraulic pressure to that portion of the PVC liner that it is in contact with. Furthermore, the previous grout lift anchors the PVC liner and resists the hydraulic pressure trying to deflect the liner which could result in the liner pulling out of the partially-cured lower grout layer or pulling the liner and grout together away from the pipe wall by overcoming the bond between the grout and pipe wall. Adequate curing may take as much as 12 to 24 hours. This limits the rate at which grout may be injected during the grouting process and increases the total time for the lining process.

Another method to prevent liner deflection due to excessive hydraulic head pressures is to increase the stiffness of the liner. The ability of the plastic liner to withstand hydraulic head pressure without significant deflection is dependent on the flexural rigidity or stiffness factor of the liner's plastic panels. Flexural rigidity is expressed mathematically as the product of the material's flexural modulus of elasticity (E) and its moment of inertia (I).

A material's flexural rigidity may be influenced by the material's geometric form. For example, a common manner of increasing a material's flexural rigidity is to locate a large amount of the material at a distance from a neutral axis, e.g., as in "I" beams.

Liner material is usually manufactured and shipped to a job sight in flat strips or standard size circular coils. The lining material must then be formed to fit the pipe's shape and must be flexible and light enough to be manually deformed. These limitations determine the maximum value of the material's flexural rigidity. For example, a liner measuring 12" wide with ½" high profile, made from rigid PVC has an EI value of 1600. For this material, it is estimated that grout lifts must be limited to about 6 to 12" of vertical rise to avoid excessive panel deflection. The limited size of these lifts significantly increases the grouting process' total time and cost.

Because of the limitations discussed above, a need exists for a method and material which may be used to line man-entry sized pipes allowing faster and more economical lining and grouting by reducing the number of successively cured lifts.

SUMMARY OF THE INVENTION

It is therefore an object of the present invention to provide a method and material for lining relatively large diameter sewer pipes.

It is a further object to provide a method and material for lining relatively large diameter sewer pipes employing grout installed with or without successively cured lifts.

It is yet another object to provide a method and material for lining relatively large diameter sewer pipes employing an inner layer of grout which provides support for an outer layer of grout.

It is yet another object to provide a method and material for lining relatively large diameter sewer pipes employing an inner layer of grout for reducing the susceptibility of a sewer liner from floating on, and being displaced by, a second layer of grout.

According to one broad aspect of the invention, there is provided a structure for lining an interior surface of a pipe, incorporating an elongated panel having an inner wall, an outer wall, an anterior end, a posterior end and first and second longitudinal edges, and means for lockingly connecting at least one the first and second longitudinal edges of the elongated panel with an opposing longitudinal edge of an adjacent elongated panel. The panel is circumferentially curved along the interior surface of the pipe, wherein the panel includes a plurality of channels defined between the inner wall and the outer wall. A plurality of lockingly connected elongated panels form a circumferentially curved surface adjacent at least a portion of the interior surface of the pipe.

According to another broad aspect of the invention, there is provided a method of lining an interior surface of a pipe, including the steps of providing an elongated panel having an inner wall, an outer wall, an anterior end, a posterior end, first and second longitudinal edges and a plurality of channels defined between the inner wall and the outer wall; curving the elongated panel so as to fit circumferentially along the interior surface of the pipe; lockingly connecting at least one of the first and second longitudinal edges of the circumferentially curved elongated panel with opposing longitudinal edges of adjacent circumferentially curved panels such that a plurality of circumferentially curved adjacent panels forms a circumferentially curved surface extending through the pipe; and positioning the plurality of circumferentially curved adjacent panels to form the circumferentially curved surface adjacent at least a portion of the interior surface of the pipe.

According to yet another broad aspect of the invention, there is provided a method of lining an interior surface of a pipe that includes the steps of providing a plurality of elongated panels, each panel having an inner wall, an outer wall, an anterior end, a posterior end, first and second longitudinal edges, and a plurality of channels defined between the inner wall and the outer wall; curvedly forming each of the plurality of panels so as to be circumferentially positionable along the interior surface of the pipe; positioning the plurality of panels adjacent one another so as to form a circumferentially curved surface extending through the pipe; lockingly connecting correspondingly opposing first and second longitudinal edges of the plurality of adjacent panels; and positioning the plurality of adjacent panels to form the circumferentially curved surface adjacent at least a portion of the interior surface of the pipe.

According to a further broad aspect of the invention, a system for lining an interior surface of a pipe incorporates a plurality of elongated panels, each panel having an inner wall, an outer wall, an anterior end, a posterior end and first and second longitudinal edges, the plurality of panels being positioned adjacent one other and circumferentially curved along the interior surface of the pipe such that the plurality of panels form a circumferentially curved surface extending through the pipe and adjacent at least a portion of the interior surface of the pipe; and means for lockingly connecting opposing first and second longitudinal edges of the plurality of adjacent elongated panels. Each one of the panels includes a plurality of channels defined between the inner wall and the outer wall.

Other objects and features of the present invention will be apparent from the following detailed description of the preferred embodiment.

BRIEF DESCRIPTION OF THE DRAWINGS

The invention will be further described in conjunction with the accompanying drawings, in which.

DETAILED DESCRIPTION OF THE PREFERRED EMBODIMENT

Figure 1:
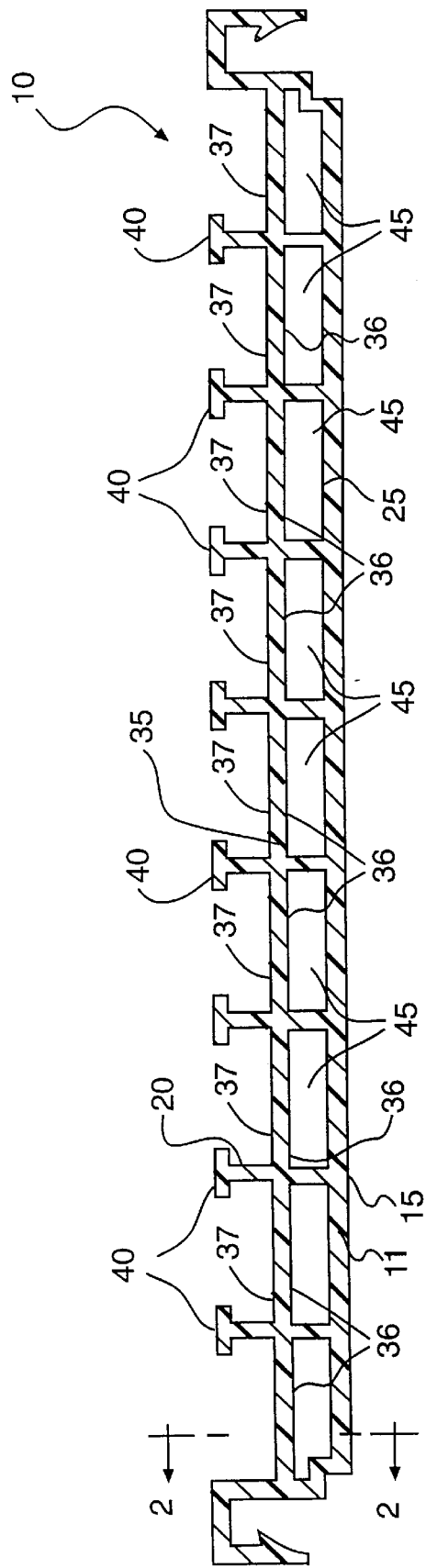
FIG. 1 is a cross sectional view of a liner panel constructed in accordance with a preferred embodiment of the invention.

With reference to the figures, wherein like reference characters indicate like elements throughout the several views and, in particular, with reference to FIG. 1, a panel 10 has an elongated and generally planar body 11, a smooth inner surface 15 and anterior and posterior terminal ends. A plurality of T-shaped legs 20 extend perpendicularly from an outer surface 25 of body 11. Upon installation as described below, T-shaped legs 20 stiffen panel 10 by increasing panel 10's flexural rigidity and may also anchor panel 10 to a grout layer (not shown).

Parallel and adjacent to outer surface 25 is a planar wall 35 having an inner wall surface 36 and an outer wall surface 37. Planar wall 35 is integrally formed with outer surfaces of T-shaped legs 20 and extends the entire width of panel 10. In this fashion, a number of interior channels 45 are bounded by outer surface 25, first and second T-shaped legs 20 and inner wall surface 36. Interior channels 45 extend the length of panel 10.

Figure 2:
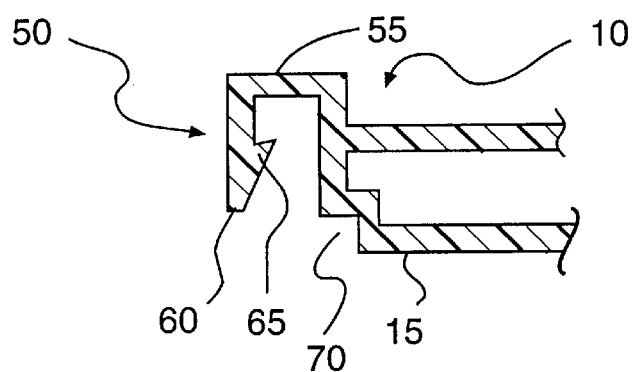
FIG. 2 is a cross sectional view of a locking mechanism taken along lines 2—2' of FIG. 1.

With reference to FIG. 2, opposing edges of panel 10 each include a locking mechanism 50. Locking mechanism 50 includes a retainer 55 having a generally U-shaped cross-section, and a terminal end 60. Terminal end 60 includes a back-swept retaining flange 65 projecting a short distance toward an opposing sidewall of retainer 55. Retainer 55 may be offset from a horizontal plane defined by inner surface 15 of panel 10 creating a notch 70.

Figure 3:
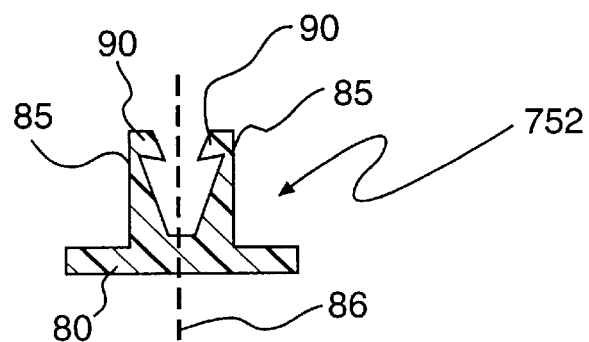
FIG. 3 is a cross sectional view of a clip constructed in accordance with a preferred embodiment of the invention.

Upon installation as discussed below, edges of two adjacent panels 10 may be secured with a joiner strip 75. With reference to FIG. 3, joiner strip 75 is formed into an elongated strip and includes a horizontal member 80 with two vertical members 85 located on opposing sides of a vertical centerline 86 bisecting horizontal member 80. Each vertical member 85 is generally perpendicular to horizontal member 80 and includes a retaining clasp 90 projecting toward vertical centerline 86.

Figure 4:
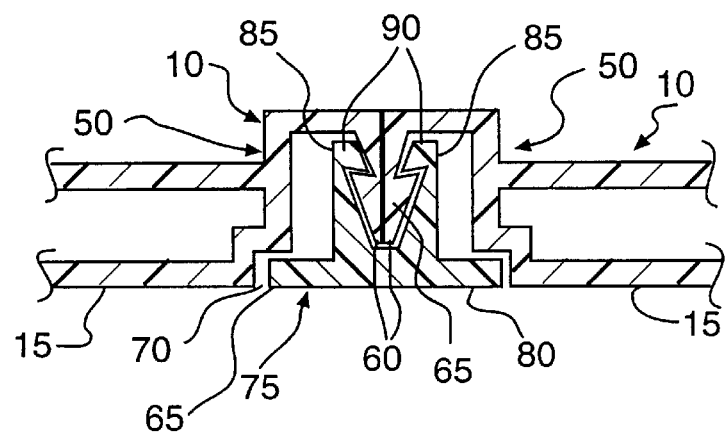
FIG. 4 is a cross sectional view of an assembled locking mechanism constructed in accordance with a preferred embodiment of the invention.

As illustrated in FIG. 4, installation of two panels 10 is performed by positioning two panels 10 adjacent one another and forcing each vertical member 85 of joiner strip 75 over a retaining flange 65 of a locking member 50. In this fashion, retaining clasps 90 and retaining flanges 65 cooperate to lock and secure each panel 10. Additionally, horizontal member 80 of joiner strip 75 fits into notch 70 of inner surface 15 resulting in a smooth and continuous inner surface throughout the length of the pipe liner.

In the preferred construction, panel 10, including body 11, T-shaped legs 20, wall 35, locking mechanism 50 and joiner strip 75 are manufactured from extruded unplasticized polyvinylchloride (uPVC) or high density polyethylene although any suitably flexible and durable material may also be used.

Preferably, grout has a low viscosity prior to curing and should be able to flow freely through relatively small channels. Grout should also be chemically compatible with the material from which panel 10 is formed. When cured, grout should have an elastic modulus much higher than the material from which panel 10 is formed (greater than 400,000 psi). Grout should preferably be formed from widely available and low cost materials such as Portland cement, fly ash or line, water and superplasticizer.

Pipes may be lined with a layer of panels 10 in a number of different configurations. For example, extensive pipe degradation may require lining a pipe's entire inner surface. Alternatively, less severe pipe degradation may require lining only a portion of a pipe's inner surface. These two alternatives are discussed below for illustrative purposes.

Figure 11:
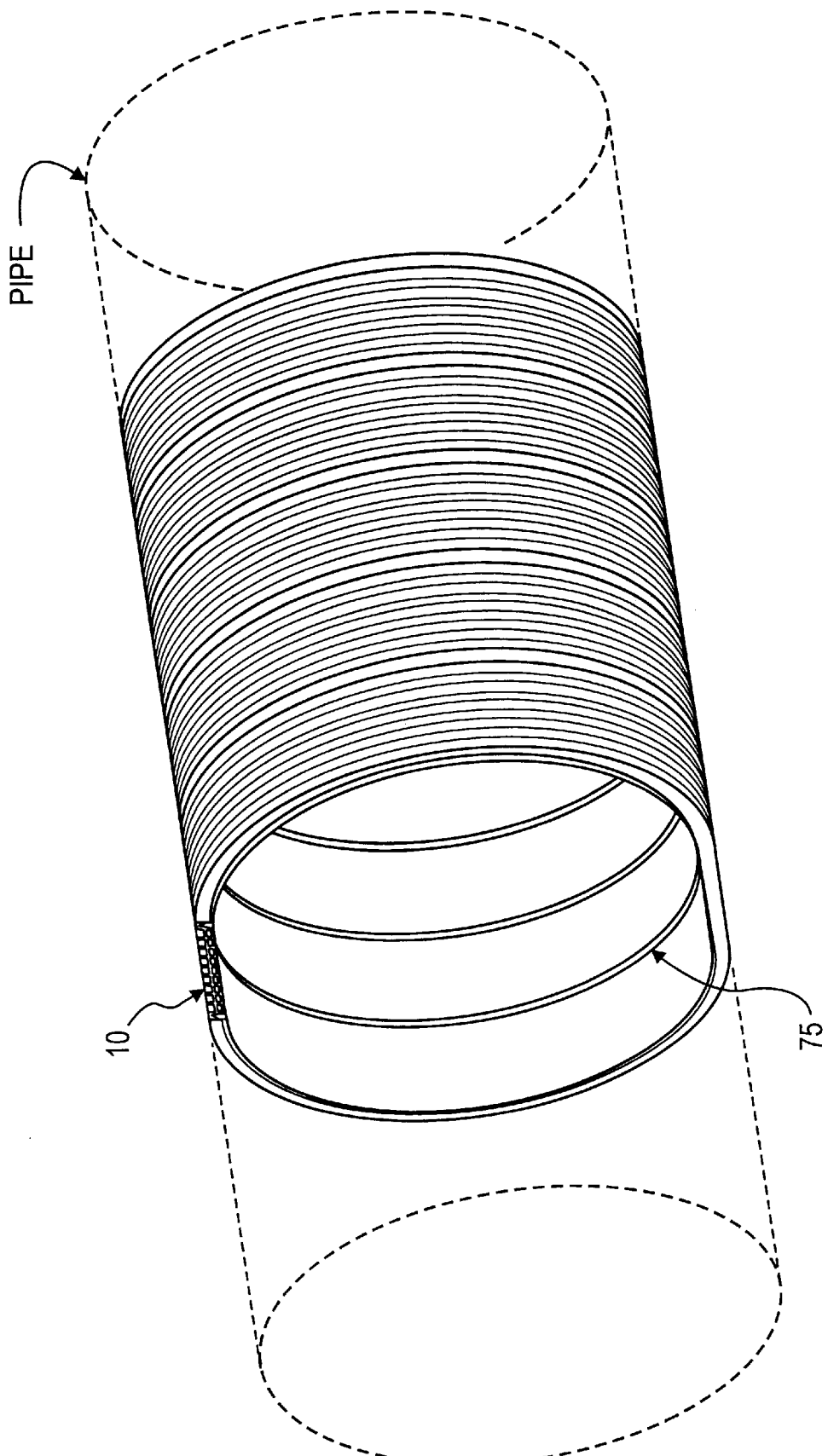
FIG. 11 is an overall perspective view of the first preferred embodiment of the present invention as applied to the interior surface of a pipe.

To line a pipe's entire inner surface, an elongated length of panel 10 may be passed through a suitable opening in the pipe. Panel 10 may then be curved around the pipe's interior surface in a continuous spiral such that terminal ends 40 of T-shaped legs 20 (FIG. 1) face the pipe's inner surface. Adjacent edges of each panel 10 winding are secured together as described above, resulting in a smooth and continuous lining substantially conforming to the pipe's inner surface (FIG. 11). In actual application, an elongated length of panel 10 would normally consist of several 200 foot lengths which are spliced together in the pipe. Such splices must allow the flow of grout to be pumped into the entire lining. Such splices would, therefore, include a plurality of individual couplings shaped as injectors on both ends. (See FIGS. 9, 110, and FIG. 6, 96.)

Figure 5:
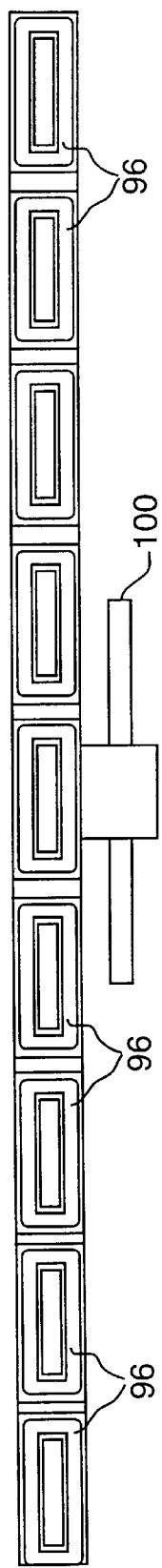
FIG. 5 is a side view of a posterior plug constructed in accordance with a preferred embodiment of the invention.
Figure 6:
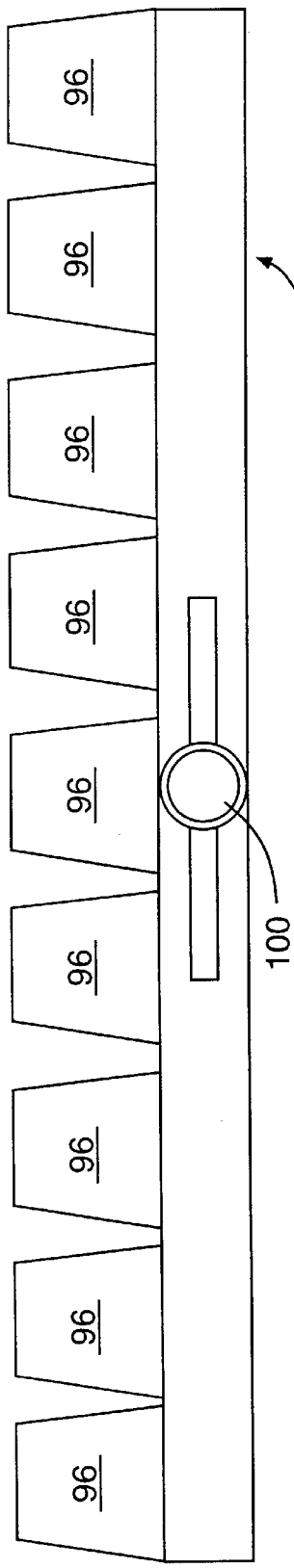
FIG. 6 is a bottom view of a posterior plug constructed in accordance with a preferred embodiment of the invention.
Figure 7:
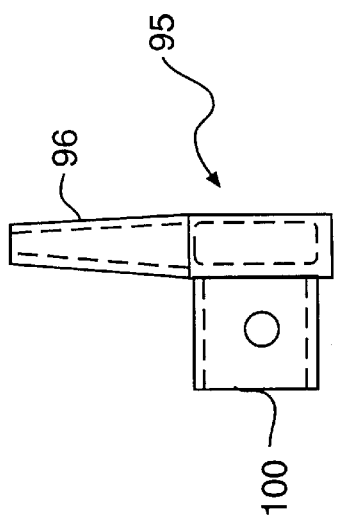
FIG. 7 is an end view of a posterior plug constructed in accordance with a preferred embodiment of the invention.

Following panel 10's installation, exposed ends of interior channel 45 located at a posterior terminal end of panel 10 are closed with a posterior plug 95. With respect to FIGS. 5 through 7, posterior plug 95 includes projections 96 configured complementary to posterior terminal end of panel 10 and seals the corresponding ends of each interior channel 45. Posterior plug 95 also includes an air escape valve 100 for allowing air to exit from each interior channel 45 when grout is injected as described below.

In a preferred embodiment, air escape valve 100 may be an end-cock allowing air to escape from interior channels 45 and which may be manually closed to prevent grout from escaping when interior channels 45 are full of grout and no air bubbles are observed in the grout flow. Alternatively, air escape valve 100 may be a plug or cap configured complementary to posterior terminal end of panel 10. This version of air escape valve 100 is installed after grout completely fills each interior channel 45.

Figure 8:
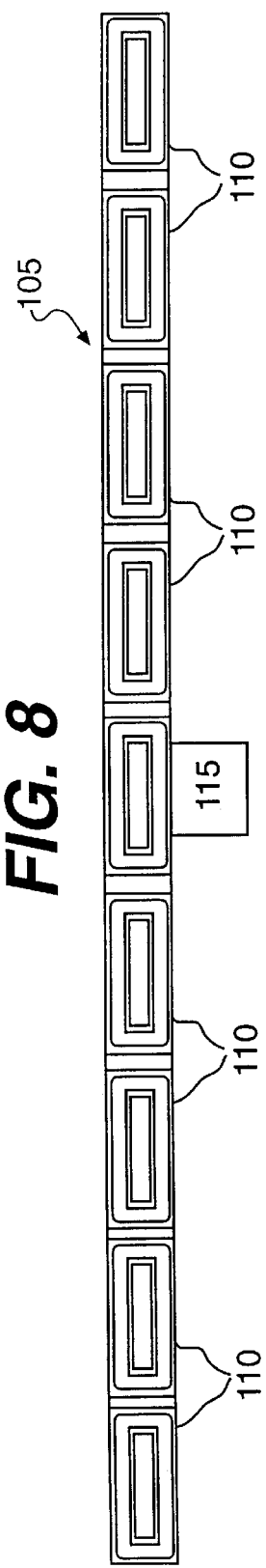
FIG. 8 is a side view of a manifold constructed in accordance with a preferred embodiment of the invention.
Figure 9:
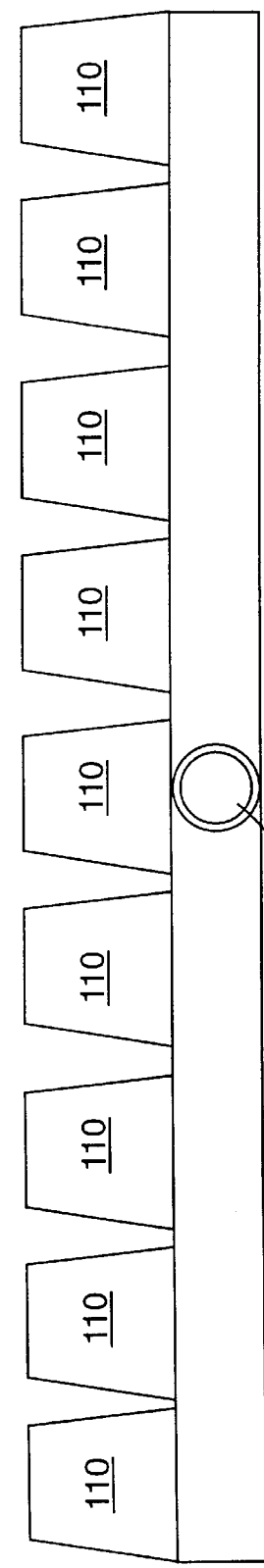
FIG. 9 is a bottom view of a manifold constructed in accordance with a preferred embodiment of the invention.
Figure 10:
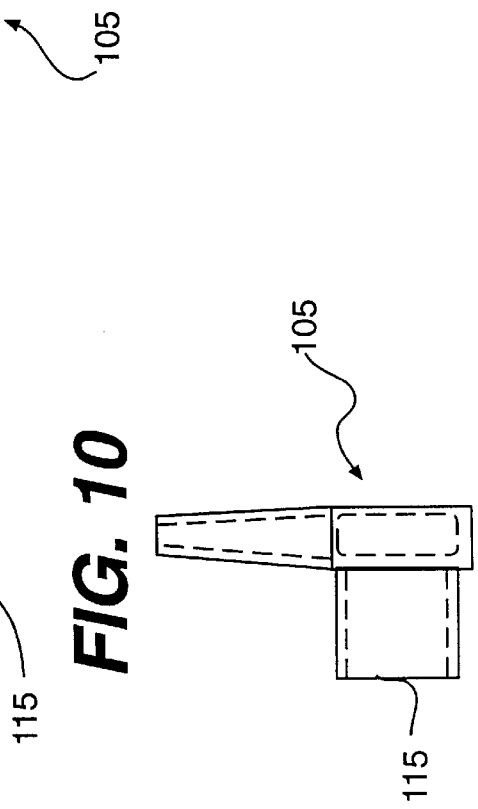
FIG. 10 is an end view of a manifold constructed in accordance with a preferred embodiment of the invention.

Grout is injected into interior channels 45 following the installation of posterior plug 95. Grout is injected into interior channels 45 by means of a manifold 105. As shown in FIGS. 8 through 10, manifold 105 includes injectors 110 configured to fit tightly within an anterior terminal end of panel 10 and which communicate with each interior channel 45. Manifold 105 further includes a receiving tube 115 for coupling with a flexible hose (not shown) through which grout is pumped.

Grout is pumped from an external reservoir, through the flexible hose and through manifold 105 into each interior channel 45 until each interior channel 45 has been completely filled with grout. When each interior channel 45 has been completely filled, manifold 105 is then left in place or is replaced with an anterior plug to prevent grout from leaking out of each interior channel 45. The anterior plug is configured similar to posterior plug 95, except the anterior plug does not have an air escape assembly. The grout is then allowed to cure, i.e. solidify and harden.

In this fashion, the entire pipe is lined with a smooth and continuous uPVC layer having an inner layer of grout. Additionally, an annulus is formed between the pipe's inner surface and wall outer surface 37 of wall 35. An additional layer of grout may then be injected into the annulus between the pipe's inner surface and wall outer surface 37. T-shaped legs 20 become anchored to this second grout layer and panel 10 is thereby securely positioned. The hydraulic head pressure of this second grout layer is supported by the first grout layer and the first grout layer's weight also increases the allowable vertical rise of the second grout layer without "floating" the liner.

Figure 12:
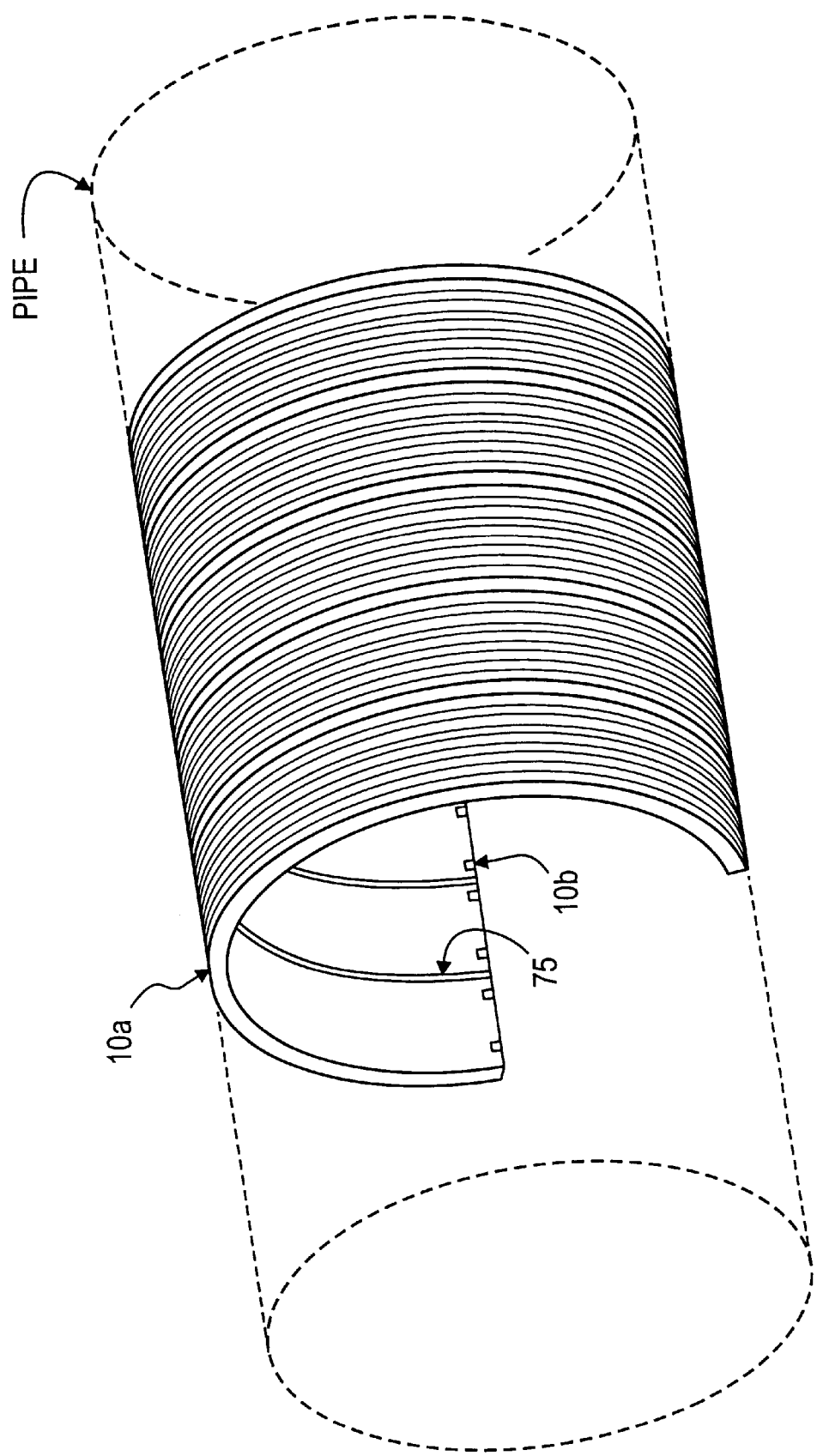
FIG. 12 is an overall perspective view of a second preferred embodiment of the present invention as applied to the interior surface of a pipe.

In contrast to lining a pipe's entire inner surface as discussed above, it may be desirable to line only portions of the pipe's inner surface. To line a portion of a pipe's inner surface, as illustrated in FIG. 12, a number of panel segments 10*a* are first cut to a predetermined length. Each segment is then curved circumferentially around the pipe's inner surface PS such that terminal ends 40 of T-shaped legs 20 face out toward the pipe's inner surface. The ends of these segments are then secured along the lower surface portions of the pipe by means of fasteners 10*b*. Examples of fasteners that may be used to secure the panel segments 10*a* include mechanical anchors, nails, J-hooks or any other conventional means of supporting the segments in place.

Adjacent edges of each panel segment 10*a* are secured together as described above, resulting in a smooth and continuous lining inside the pipe. Specifically, opposing edges of two adjacent panel segments 10*a* may be secured with a joiner strip segment 75*a* that is cut to the same predeteremined length as the panel segments 10*a*. As with the joiner strip 75 shown in FIG. 3, each joiner strip segment 75*a* is formed into an elongated strip and includes a horizontal member 80 with two vertical members 85 located on opposing sides of a vertical centerline 86 bisecting horizontal member 80. Each vertical member 85 is generally perpendicular to horizontal member 80 and includes a retaining clasp 90 projecting toward vertical centerline 86.

Installation of two panel segments 10*a* is performed by positioning two panel segments 10*a* adjacent one another and forcing each vertical member 85 of joiner strip segment 75*a* over a retaining flange 65 of a locking member 50. In this fashion, retaining clasps 90 and retaining flanges 65 cooperate to lock and secure each panel 10. Additionally, horizontal member 80 of joiner strip segment 75*a* fits into notch 70 of inner surface 15 resulting in a smooth and continuous inner surface between the adjacent panel segments 10*a* and throughout the length of the pipe liner.

Following installation of the lining, the posterior terminal end of each panel 10 segment is closed with posterior plug 95 as described above. Grout is then injected into each panel 10 segment and cured as described above. Manifold 105 may also be replaced with the anterior plug. In this fashion, a portion of the pipe's inner surface is lined with a smooth and continuous uPVC layer. Again, a gap is formed between the pipe's inner surface and wall outer surface 37.

An additional layer of grout may then be injected between the pipe's inner surface and wall outer surface 37. T-shaped legs 20 become anchored to this second grout layer and the liner is thereby securely positioned. The hydraulic head pressure of this second grout layer is resisted by the first grout layer.

In this manner, a lining for an inner surface of a pipe is formed having a smooth inner surface, T-shaped legs 20 extending perpendicularly from outer surface 25 and having a number of interior channels 45. Additionally, a cavity is formed between the inner surface of the pipe and outer wall surface 37.

This liner may have interior channels 45 filled with grout and anterior and posterior terminal ends enclosed by the anterior plug and posterior plug 95 respectively. Additionally, the liner may also have the annulus between the inner surface of the pipe and outer wall surface 37 filled with grout. Finally, the liner may have anterior and posterior terminal ends enclosed by a modification of the anterior plug and posterior plug 95.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A structure for lining an interior surface of a pipe, comprising:

an elongated panel having an inner wall, an outer wall, an anterior end, a posterior end and first and second longitudinal edges, said panel adapted to be circumferentially curved along the interior surface of said pipe and spaced therefrom, wherein said panel includes a plurality of channels defined between said inner wall and said outer wall; and means for circumferentially lockingly connecting along the interior surface of the pipe at least one of the first and second longitudinal edges of said elongated panel with an opposing longitudinal edge of an adjacent elongated panel whereby a plurality of circumferentially lockingly connected elongated panels form a circumferentially curved surface adjacent at least a portion of the interior surface of said pipe such that each one of said channels is adapted to circumferentially extend along the interior surface of said pipe along with said panel;

first grouting material formed in said plurality of channels to stiffen said panels sufficiently to prevent said panels from deflecting substantially; and second grouting material formed between said outer wall of said panel adapted to be circumferentially curved along the interior surface of said pipe and the interior surface of said pipe.

2. A structure for lining an interior surface of a pipe as claimed in claim 1, wherein said panel further includes means for stiffening said panel, said stiffening means being formed at least on an exterior surface of said outer wall and extending longitudinally along said panel.

3. A structure for lining an interior surface of a pipe as claimed in claim 2, wherein said stiffening means includes a plurality of T-shaped legs extending perpendicular to said inner and outer walls of said panel, said plurality of channels being defined by said inner and outer walls of said panel and said plurality of T-shaped legs extending perpendicular from said inner wall and through said outer wall.

4. A structure for lining an interior surface of a pipe as claimed in claim 1, wherein said anterior end and said posterior end are defined on opposite longitudinal portions of said panel, and said plurality of channels are defined to open into said anterior and posterior ends, further comprise:

means for plugging at least one of said anterior and posterior ends of said panel so as to sealably close said plurality ol channels at a corresponding end thereof.

5. A structure for lining an interior surface of a pipe as claimed in claim 4, wherein said plugging means includes a plugging panel having a length corresponding to a width of at least one of said anterior and posterior ends of said elongated panel, and a plurality of plug projections extending perpendicular to said length of said plugging panel, each of said plug projections being formed to plug into a corresponding one of said plurality of channels defined in said elongated panel.

6. A structure for lining an interior surface of a pipe as claimed in claim 4, wherein said plugging means includes a plugging panel having a length corresponding to a width of at least one of said anterior and posterior ends of said elongated panel, a plurality of plug projections extending perpendicular to said length of said plugging panel, each of said plug projections being formed to plug into a corresponding one of said plurality of channels defined in said elongated panel, and an escape valve connected to said plugging panel through which air may escape through said plug projections and said plugging panel from said plurality of channels when grouting material is formed therein.

7. A structure for lining an interior surface of a pipe as claimed in claim 4, further comprising:

means for injecting grouting material into said plurality of channels, said grouting injecting means including a manifold having a length corresponding to a width of at least one of said anterior and posterior ends of said panel, a plurality of manifold injectors extending perpendicular to said length of said manifold, each of said manifold injectors being formed to plug into a corresponding one of said plurality of channels defined in said panel, and a grout receiving tube connected to said manifold through which grouting material is introduced through said manifold and said manifold injectors and into said plurality of channels.

8. A structure for lining an interior surface of a pipe as claimed in claim 1, wherein said panel is formed from at least one of unplasticized polyvinylchloride and high density polyethylene.

9. A structure for lining an interior surface of a pipe as claimed in claim 1, wherein said means for circumferentially lockingly connecting along the interior surface of the pipe at least one of the first and second longitudinal edges of said elongated panel with an opposing longitudinal edge of said adjacent elongated panel includes an elongated joiner strip having upstanding joiner members formed on an outer surface thereof and extending longitudinally along an entire length of said joiner strip, said first and second longitudinal edges of said panel each being formed with a retainer portion extending longitudinally along an entire length of said first and second longitudinal edges, said retainer portions having a generally U-shaped cross-section, and said joiner strip being positioned between said elongated panels such that said joiner members ol said joiner strip longitudinally inter-engage retainer portions of said opposing first and second longitudinal edges of of said elongated panels.

10. A system for lining an interior surface of a pipe, comprising:

a plurality of elongated panels, each panel having an inner wall, an outer wall, an anterior end, a posterior end and first and second longitudinal edges, said plurality of panels being positioned adjacent one other and adapted to be circumferentially curved along the interior surface of said pipe such that said plurality of panels are adapted to form a circumferentially curved surface extending along said pipe and spaced from the interior surface of said pipe;

means for circumferentially lockingly connecting along the interior surface of the pipe opposing first and second longitudinal edges of said plurality of adjacent elongated panels, wherein each individual one of said panels includes a plurality of channels defined between said inner wall and said outer wall such that each one of said channels is adapted to circumferentially extend along the interior surface of said pipe along with each individual one of said panels;

first grouting material formed in said plurality of channels to stiffen said panels sufficiently to prevent said panels from deflecting substantially; and second grouting material formed between said outer wall of each said panel adapted to be circumferentially curved along the interior surface of said pipe and the interior surface of said pipe.

11. A system for lining an interior surface of a pipe as claimed in claim 10, wherein each individual one of said plurality of panels includes means for stiffening said individual panel, said stiffening means being formed at least on an exterior surface of said outer wall and extending longitudinally along said individual panel.

12. A system for lining an interior surface of a pipe as claimed in claim 11, wherein said stiffening means includes a plurality of T-shaped legs extending perpendicular to said inner and outer walls of each of said plurality of panels, said plurality of channels being defined by said inner and outer walls of each of said panels and said plurality of T-shaped legs extending perpendicular from said inner wall and through said outer wall.

13. A system for lining an interior surface of a pipe as claimed in claim 10, wherein said plurality of panels are formed from at least one of unplasticized polyvinylchloride and high density polyethylene.

14. A system for lining an interior surface of a pipe as claimed in claim 10, wherein said means for circumferentially lockingly connecting alone the interior surface of the pipe opposing first and second longitudinal edges of said plurality of adjacent elongated panels includes a plurality of elongated joiner strips each having upstanding joiner members formed on an outer surface thereof and extending longitudinally along an entire length of each said joiner strip, said first and second longitudinal edges of each of said panels each being formed with a retainer portion extending longitudinally along an entire length of said first and second longitudinal edges, said retainer portions having a generally U-shaped cross-section, and each said joiner strip being positioned between said plurality of adjacent elongated panels such that said joiner members of each said joiner strip longitudinally inter-engage retainer portions of said opposing first and second longitudinal edges of corresponding adjacent elongated panels.

15. A method of lining an interior surface of a pipe, comprising the steps of:

providing an elongated panel having an inner wall, an outer wall, an anterior end, a posterior end, first and second longitudinal edges and a plurality of channels defined between said inner wall and said outer wall;

curving said elongated panel so as to fit circumferentially along and spaced from the interior surface of said pipe;

circumferentially lockingly connecting along the interior surface of the pipe at least one of the first and second longitudinal edges of said curved elongated panel with an opposing longitudinal edge of an adjacent curved elongated panel such that a plurality of said curved adjacent panels form a circumferentially curved surface extending through said pipe;

positioning said plurality of curved adjacent panels to form the circumferentially curved surface adjacent at least a portion of the interior surface of said pipe such that each one of said channels circumferentially extends along the interior surface of said pipe along with said panel;

injecting a first grouting material into said plurality of channels defined between said inner and outer walls of said panel after said step of positioning to stiffen said panels sufficiently to prevent said panels from deflecting substantially; and injecting a second grouting material between the outer wall of said circumferentially curved panel and the interior surface of said pipe after said step of injecting said first grouting material.

16. A method of lining an interior surface of a pipe as claimed in claim 15, wherein said anterior end and said posterior end are defined on opposite longitudinal portions of said panel, and said plurality of channels are defined to open into said anterior and posterior ends, further comprising the step of:

plugging at least one of said anterior and posterior ends of said panel so as to sealably close said plurality of channels at a corresponding end thereof after said step of positioning.

17. A method of lining an interior surface of a pipe as claimed in claim 16, wherein said step of plugging said panel includes providing a plugging panel that includes a length corresponding to a width of at least one of anterior and posterior ends of said elongated panel, a plurality of plug projections extending perpendicular to said length of said plugging panel, each of said plug projections being formed to plug into a corresponding one of said plurality of channels defined in said elongated panel, and an escape valve connected to said plugging panel through which air may escape through said plug projections and said plugging panel from said plurality of channels when grouting material is injected therein.

18. A method of lining an interior surface of a pipe as claimed in claim 15, wherein said step of providing said panel includes forming said panel from at least one of unplasticized polyvinylchloride and high density polyethylene.

19. A method of lining an interior surface of a pipe as claimed in claim 15, wherein said step of providing said panel includes forming each of first and second longitudinal edges of said panel with a retainer portion extending longitudinally along an entire length of said first and second longitudinal edges, said retainer portions having a generally U-shaped cross-section, and said step of circumferentially lockingly connecting along the interior surface of the pipe opposing first and second longitudinal edges of adjacent curved panels includes providing an elongated joiner strip having upstanding joiner members formed on an outer surface thereof and extending longitudinally along an entire length of said joiner strip, and positioning said joiner strip between said adjacent curved panels such that said joiner members of said joiner strip longitudinally inter-engage retainer portions of said opposing first and second longitudinal edges of said adjacent curved panels.

20. A method of lining an interior surface of a pipe as claimed in claim 15, wherein said anterior end and said posterior end are defined on opposite longitudinal portions of said panel, and said plurality of channels are defined to open into said anterior and posterior ends, and said step of injecting a first grouting material into said plurality of channels defined between said inner and outer walls of said panel further includes plugging at least one of said anterior and posterior ends of said panel so as to sealably close said plurality of channels at a corresponding end thereof.

21. A method of lining an interior surface of a pipe as claimed in claim 20, wherein said step of plugging said panel includes providing an escape valve through which air may escape from said plurality of channels when grouting material is injected therein.

22. A method of lining an interior surface of a pipe as claimed in claim 15, wherein said step of injecting said first grouting material into said plurality of channels includes providing a manifold that has a length corresponding to a width of at least one of anterior and posterior ends of said curved panel, a plurality of manifold injectors extending perpendicular to said length of said manifold, each of said manifold injectors being formed to plug into a corresponding one of said plurality of channels defined in said curved panel, and a grout receiving tube connected to said manifold through which said second grouting material is introduced through said manifold and said manifold injectors and into said plurality of channels, plugging said anterior end of said curved panel with said manifold, and injecting said second grouting material into said grout receiving tube.

23. A method for lining an interior surface of a pipe, comprising the steps of:

providing a plurality of elongated panels, each panel having an inner wall, an outer wall, an anterior end, a posterior end, first and second longitudinal edges, and a plurality of channels defined between said inner wall and said outer wall;

curvedly forming each of said plurality of panels so as to be circumferentially positionable along and spaced from the interior surface of said pipe;

positioning said plurality of panels adjacent one another so as to form a circumferentially curved surface extending through said pipe;

circumferentially lockingly connecting along the interior surface of the pipe said first longitudinal edge of each one of said elongated panels with said second longitudinal edge of an adjacent said panel; and positioning said plurality of adjacent panels to form the circumferentially curved surface adjacent at least a portion of the interior surface of said pipe such that each one of said channels circumferentially extends along the interior surface of said pipe along with each individual one of said panels;

injecting a first grouting material into said plurality of channels defined between said inner and outer walls of each of said plurality of panels after said step of positioning to stiffen said panels sufficiently to prevent said panels from deflecting substantially; and injecting a second grouting material between said outer wall of said elongated panels and the interior surface of said pipe after said step of injecting said first grouting material.

24. A method for lining an interior surface of a pipe as claimed in claim 23, wherein said step of providing said plurality of panels includes forming said panels from at least one of unplasticized polyvinylchloride and high density polyethylene.

25. A method for lining an interior surface of a pipe as claimed in claim 23, wherein said step of providing said plurality of panels includes forming each of first and second longitudinal edges of each of said panels with a retainer portion extending longitudinally along an entire length of said first and second longitudinal edges, said retainer portions having a generally U-shaped cross-section, and said step of circumferentially lockingly connecting along the interior surface of the pipe opposing first and second longitudinal edges of said adjacent curved portions includes providing a plurality of elongated joiner strips each having upstanding joiner members formed on an outer surface thereof and extending longitudinally along an entire length of each said joiner strip, and positioning each said joiner strip between each of said plurality of adjacent panels such that said joiner members of said joiner strip longitudinally interengage retainer portions of said opposing first and second longitudinal edges of said plurality of adjacent panels.

* * * * *